Sept. 1, 1953     G. S. SPERTI     2,650,882
CYCLICAL PROCESS AND APPARATUS FOR TENDERIZING MEAT
Filed Aug. 5, 1946
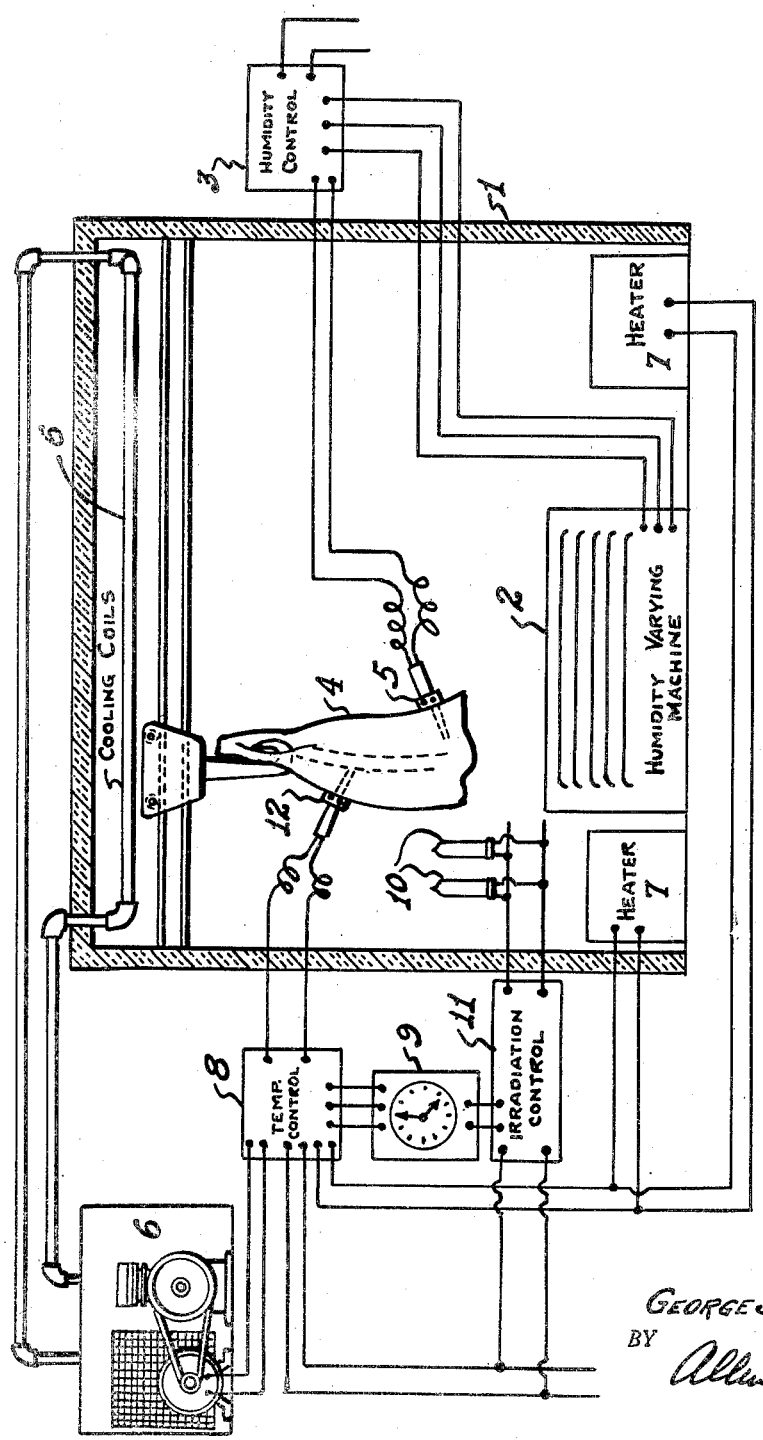
INVENTOR.
GEORGE S. SPERTI.
BY
ATTORNEYS.

UNITED STATES PATENT OFFICE 2,650,882

CYCLICAL PROCESS AND APPARATUS FOR TENDERIZING MEAT

George S. Sperti, Burlington, Ky., assignor to Institutum Divi Thomae Foundation, Cincinnati, Ohio, a corporation of Ohio Application August 5, 1946, Serial No. 688,389

5 Claims. (Cl. 99—107)

My invention relates to the tenderizing of meats, and has for its principal object the provision of processes whereby the enzymatic and other tenderizing actions may be made to occur more expeditiously and thoroughly and with less wastage of the meat.

It has hitherto been proposed to tenderize meats by holding them for long periods of time at temperatures around or somewhat above 45° F. Irradiation with ultra-violet light was proposed to cut down the activity of bacteria and molds on the surfaces of the meat; and the maintenance of high relative humidities in the storage chamber has been proposed to minimize the drying-out of surface layers of the meat pieces, which has been one of the factors requiring heavy trimming of the meat pieces and producing substantial loss.

These procedures and expedients have not, however, proved completely successful. Loss at the surface of the meat is still high, due to discoloration, and to the activity of microorganisms at the temperatures involved and in the presence of moisture condensing upon the meat pieces. These conditions involve so much difficulty that the tenderizing chambers usually have a high and unpleasant odor. It has not been found practicable in such procedures adequately to control the activity of microorganisms by continuous, sufficiently intense ultra-violet radiations without having the radiations themselves deleteriously affect the surfaces of the meat.

Other objects of the invention lie in the solution of these problems and analogous ones in the tenderizing of meats.

My invention is based on discoveries having to do with cyclical temperature treatments of the meat pieces accompanied by correlated control of other factors, all as will be disclosed hereinafter. The various objects of the invention which have been set forth above, as well as others which will be clear to the skilled worker in the art upon reading this specification, I accomplish in those procedures of which I shall now describe exemplary embodiments.

Reference is made to the accompanying drawing which diagrammatically illustrates apparatus elements which may be used in the practice of my invention.

In the practice of my invention I have found that meats may be expeditiously and thoroughly tenderized by proceeding in accordance with a cyclical temperature program involving at least one period of treatment at relatively very high temperatures, providing the various elements of control are exercised as will be fully explained.

In standard packing house procedure, after the animals have been killed and dressed, the meat is cut into desired pieces such, for example, as sides or quarters. These are then washed and are introduced into a pre-cooler or pre-chill chamber maintained at a low temperature, say around 32° F. In the case of beef pieces, these are shrouded before being introduced into the pre-chill chamber.

The meat pieces are maintained in the chamber at least for a long enough period to abstract all bodily heat and reduce all parts of the meat pieces to a desired temperature in the neighborhood of freezing or even below in some instances. The meat may be stored in the pre-chill chamber if desired until ready for distribution if it is not to be tenderized; and it is normally transferred from the pre-chill chamber to a tenderizing chamber 1, with the removal of any shrouds, when tenderizing is desired.

The use of the cyclical treatment hereinafter described is dependent upon the attainment of a high degree of surface sterilization of the meat pieces, i. e., a low surface bacterial count. It is common practice to employ ultra-violet radiation both in pre-chill chambers and in tenderizing chambers; but inasmuch as intense ultra-violet radiation long continued has a tendency to produce discoloration and sunburn in the meat pieces, it has been the practice to diminish the intensity of the irradiations to a point where discoloration does not occur within the space of time of the storage or tenderizing treatments. Under these circumstances, the intensity of the irradiations is not sufficient to control the activity of microorganisms which, under conditions of temperature well above freezing, and under conditions of moisture hereinafter set forth, multiply rapidly enough to produce sliming, discoloration, and odor with consequent high trimming loss. A much more thorough sterilization is contemplated in my process as a prerequisite.

In a co-pending application, Serial No. 660,367, filed April 8, 1946, and entitled Method and Means for Treating Meats, John R. Lostro has described processes of producing a high degree of surface sterilization in a treatment extending over but a few minutes of time. The meat pieces after dressing and washing are passed rapidly through a small chamber in which a very high intensity of ultra-violet radiations is maintained. To prevent deleterious surface effects, the meat pieces are maintained in a current of rapidly moving air, their surfaces being moist from the previous washing step. In this way, the surface microorganisms can be reduced to a very low count, without an impairment of the surfaces of the meat pieces. In the case of beef, the initial sterilization is followed by shrouding with sterile shrouds, and the pieces then go to the pre-chill chamber.

I may follow this procedure in preparing my meat pieces for tenderization, but I am not restricted to it. Instead, or in addition, I may sterilize my meat pieces during or at the conclusion of the pre-chill treatment. It has been found that the irradiation of meats at low temperatures is more effective in killing surface microorganisms than at higher temperatures, an effect which I believe to be due to the decreased activity and resistance of the microorganisms at low temperatures. Thus, I have found that it is readily possible by treating the surface of meats when the pieces are at low temperatures (comparable to or only slightly above those of the pre-chill chamber) to use an intensity of ultraviolet light sufficient to produce a high degree of surface sterilization without encountering discoloration. Thus, when the meat pieces have been brought down to temperature in the pre-chill chamber, and prior to their removal for tenderizing, I may step up the intensity of irradiation in the pre-chill chamber for sterilizing. Or I may pass the meat pieces on their way from the pre-chill chamber to the tenderizing chamber through a high intensity cabinet similar to that described in the Lostro application noted above. Or again I may irradiate the pieces strongly after they have been introduced into the tenderizing chamber but before their temperature has been allowed to rise more than say ten or fifteen degrees above the temperature of the pre-chill chamber. As the temperature of the meat pieces rises, the irradiation is diminished or stopped in order to avoid discoloration. Sterilization may also be accomplished in other ways as, for example, chemically. Where sterilization is accomplished by ultra-violet radiations, care should be taken with the placement of the light sources or the exposure of the meat pieces to them so as to irradiate all parts of the surfaces of the meat pieces sufficiently. Any folds or skirts in the meat pieces should be propped open with sticks of wood or the like.

As indicated above, I employ processes which are cyclical as to temperature and involve at least one period of relatively very high temperature. My meat pieces are able to withstand periods of high temperature because of the very low bacterial count of their surfaces. Yet, since the degree of sterilization is not absolute, it may become necessary to resterilize from time to time. Where ultra-violet radiation is used, I prefer, as set forth in my Patent No. 2,384,203, dated September 4, 1945, to confine the periods of higher intensity irradiations to the periods of lower temperature in the temperature cycle. In that patent, I contemplated tenderizing meats in chambers where variations of temperature might occur for various reasons, including the fact that in any refrigerated chamber the temperature is likely to rise during the working day because of the opening of doors for the introduction or removal of meat pieces, and to fall during the night time or during periods of closed storage; and I disclosed an apparatus acting to confine periods of irradiation, or periods of high intensity irradiation, to periods of temperature below certain selectable maxima, there being provision also for brief periods of irradiation at determined intervals irrespective of changes in temperature. In carrying out the present invention, I may employ the apparatus of that patent for irradiation control in the tenderizing chamber.

It is my practice to confine the higher intensity irradiations to the lower temperature portions of my cycle, either using at other times no irradiation at all or only such irradiation as will be required to maintain a generally low count of microorganisms in the air of the tenderizing chamber.

It is of advantage to maintain in the tenderizing chamber a substantial circulation of air during all parts of the treatment. This circulation may involve a mere movement of the air in the chamber or it may involve the introduction of outside air accompanied by the escape of air from the chamber.

The conditions of humidity within the tenderizing chamber are exceedingly important. As indicated above, it has hitherto been suggested that high humidity be maintained in tenderizing chambers, the object being to minimize drying out of the surface portions of the meat pieces and consequent loss from this factor. Thus, relative humidities of as high as 90% have been suggested. This, however, does not solve the problem. Evaporation from the surface of a piece of meat is a phenomenon involving vapor pressures and is not solely a function of the water content of the surrounding air at any given temperature, if the relative humidity is less than 100%. Moreover, it is just as important to prevent condensation of moisture from the air onto the meat pieces, as it is to prevent loss to the air of the natural moisture of the meat pieces.

In my process, I endeavor to maintain at all times an equilibrium between the vapor pressure of moisture in the air and the vapor pressure of moisture in the meat.

In order to accomplish this, it is necessary to adjust the humidity of the air surrounding the meat to a value which is determined by the temperature of the meat rather than by the general temperature of the air in the tenderizing chamber. I maintain the humidity of the air at a value which will prevent both substantial deterioration of the meat and the precipitation of moisture on it. Since widely varying temperatures are employed in my cyclical treatments, this involves a constant adjustment of humidity, as well as rapid adjustments at certain times, and is best accomplished automatically.

It will be understood that the humidity of the air in a tenderizing compartment may be diminished by introducing drier air and may be increased by adding moisture to the air as by sprays, steam, or the like. To accomplish humidity control automatically, I couple means for varying the actual humidity, diagrammatically indicated at 2, through control means 3 with thermostatic means operated by changes in the temperature of the meat. This preferably involves selecting one or more of the meat pieces 4 and associating a thermostatic means 5 directly with it or them. Again, since meat contains approximately 90% of water, it is possible to obtain a good result by associating thermostatic means with a body of water placed in the tenderizing chamber, providing care is taken to make sure that the temperature of the body of water varies as does the temperature of the meat pieces. It will be understood that at the start of a tenderizing treatment, the meat pieces may be introduced into the tenderizing chamber at temperatures differing substantially from the general temperature of the air in the tenderizing compartment. Also, in a cyclical process where fairly wide variations of temperature are effected by warming or cooling down the tenderizing compartment, there will be a distinct lag in the temperature of the meat as it endeavors to follow the temperature of the air during such changes. All of these factors complicate the situation and make it necessary to follow the type of control set forth above.

Where, however, the humidity of the air can be adjusted to the vapor pressure of the moisture in the meat as aforesaid, and where the meat pieces can be sterilized to a high degree before or at the start of the tenderizing process, I have found that it is possible to effect tenderization rapidly and thoroughly in cyclical processes involving periods of quite high temperatures.

Thus in one aspect my process contemplates steps such as the following:

The meat pieces are sterilized by irradiation or otherwise at low temperatures, which will be below 60° F. (and preferably well below 45° F., where the meat is irradiated) for time intervals sufficient to insure a low surface bacterial count. Then the ultra-violet light is turned off or dimmed and the temperature of the meat is raised to a higher value, usually between 60° and 90° F. I simultaneously automatically adjust the humidity of the surrounding air to values which will insure substantially no loss of weight by the meat due to evaporation and no condensation of moisture on it, not only at the high final temperatures, but during the temperature changes aforesaid. The meat is held at the high temperature during a predetermined interval, whereupon the temperature is again lowered to a value at least as low as 60° F. and preferably as low as well below 45° F. Sterilization or some degree of bacteriological control is again practiced at the lower temperature. Where ultra-violet light is employed, the lights are again turned on or increased in intensity. Such a cycle is repeated as often as is necessary to tenderize the meat to the desired degree.

Controlling means for the tenderizing chamber 1 is indicated at 6 and heating means at 7. These are controlled by a control box 8 in connection with a clock or other timing means 9 for determining the normal length of high and low temperature portions of the cycle. Sources of ultra-violet radiation diagrammatically shown at 10 may likewise be connected with the time control mechanism through a control box 11.

The length of time at which the meat is held at the high temperature will be determined by various factors. One of these is bacteriological activity. If the meat pieces are first sterilized to a very low bacterial count, and if the air within the tenderizing chamber is maintained substantially sterile, and if condensation of moisture on the meat pieces is prevented, the meat pieces will withstand a long exposure to high temperatures without developing any such degree of bacteriological activity at their surfaces as would lead to a large trimming loss.

Another factor to be considered, however, is that meat spoils rapidly or becomes "sour" in the immediate vicinity of the bone when a certain temperature is reached. The size of the meat pieces and the actual temperature of the surrounding air, will determine the length of time required to bring the meat immediately adjacent to the bone to a dangerously high temperature. I prefer to supplement the thermostatic control employed to vary the humidity of the air in the tenderizing chamber with a thermostatic device or devices 12 made to be responsive to the temperature of the meat at the bone in a selected piece or pieces of meat. These last-mentioned thermostatic devices are connected to the temperature control box 8 of the cyclical control system and are made to control the temperature of the air in the tenderizing chamber, preferably in the sense of terminating the high temperature part of the tenderizing cycle when a predetermined high temperature is reached in the meat. Otherwise, the timing of the parts of the cycle may be accomplished by any suitable means for measuring the passage of time, e. g. the time control mechanism 9.

The actual variations of temperature in the tenderizing compartment will be effected by variations in the operation of refrigerating means and/or heating means controlled by the chronograph 9 and by the last mentioned thermostatic devices. I prefer to carry on the cycles in a single tenderizing compartment in which the meat pieces remain until the treatment is ended. It does not violate the spirit of the invention, however, to transfer the meat pieces from chamber to chamber, where the chambers are maintained at specifically different temperatures; but this complicates the problem of humidity control because it produces wider variations between the temperature of the meat and the temperature of the surrounding air.

While these cycles may be widely varied; and will be varied for different kinds of meat and different sizes of meat pieces, I have, for example, achieved very satisfactory results in tenderizing sides and quarters of beef in treatments in which they are maintained at high temperatures (around 75° F.) for a period of approximately ten hours after which they are chilled and maintained at a temperature below 45° for a period of approximately fourteen hours. The maintenance of meat at relatively low temperatures, but temperatures at which enzymatic activity can nevertheless occur, following a period of tenderization at quite high temperatures, appears to be an advantage in itself, while as has already been pointed out, the chilling of the meat pieces after a period of high temperature treatment may be required for re-sterilization, as well as for preventing too high a rise in temperature of the meat adjacent the bone. The number of cycles required to tenderize any given piece of meat will depend to a large extent upon the size and mass of the meat pieces as well as on the kind, character, and condition of the meat itself.

Modifications may be made in my invention without departing from the spirit of it. Having thus described my invention in certain exemplary embodiments, what I claim as new and desire to secure by Letters Patent is:

1. A process of tenderizing meat pieces which comprises reducing meat pieces uniformly to a temperature in the neighborhood of 32° F., producing a high degree of sterilization of the surfaces of said meat pieces, then raising the temperature of the meat pieces to a high tenderizing temperature substantially between 60° and 90° F., maintaining the meat in such high temperature for a period of hours, thereafter reducing the temperature of the meat pieces to below around 45° F. and again subjecting the surfaces thereof to a sterilization treatment, and continuously maintaining the humidity of the air surrounding the meat pieces so as substantially to prevent both loss of moisture by the meat pieces and condensation of moisture thereon by varying the humidity of said air in accordance with the actual temperature of said meat pieces, and initiating the last mentioned low temperature treatment upon the attainment of a predetermined maximum temperature by portions of the meat pieces lying adjacent the bone therein.

2. A process of tenderizing meat pieces which comprises carrying said meat pieces uniformly to a low temperature around 32° F., producing a high degree of surface sterilization of the meat pieces by means of high intensty ultraviolet irradiation, and thereafter subjecting the meat pieces to cyclical variations of temperature having maxima above around 60° F. and minima below around 45° F., while maintaining the humidity of air surrounding the meat pieces at values such as substantially to prevent both loss of moisture by the meat pieces and condensation of moisture thereon, the meat pieces being irradiated during low temperature portions of the cycle and the duration of time of the high temperature portions of the cycle determined at the maximum by the attainment of a predetermined temperature of the portions of the meat pieces adjacent the bones therein.

3. In apparatus for tenderizing meat a chamber having temperature control means, means for causing the temperature of said chamber to undergo cyclical variations, means for varying the humidity of the air in said chamber, a temperature responsive device controlled by the actual temperature of said meat, and a connection between said device and said last mentioned means for varying the humidity in said chamber in accordance with said meat temperature.

4. An apparatus for tenderizing meat comprising a tenderizing chamber, temperature control means for said chamber, means for causing said temperature control means to produce a cyclical variation of the temperature of said chamber, means for varying the humidity of the air in said chamber, thermostatic means associated with the meat, and means for causing said thermostatic means to control said humidity varying means.

5. An apparatus for tenderizing meat pieces of substantial bulk and containing bone, said apparatus comprising a tenderizing chamber containing said meat pieces at an initial low temperature, temperature control means for said chamber whereby the temperature of the air therein may be raised to raise the temperature of said meat pieces, and thereafter lowered to lower the temperature of said meat pieces, means for varying the humidity of the air in said chamber, thermostatic means associated with the meat pieces for controlling the last mentioned means to the end of substantially preventing both loss of moisture by the meat pieces and condensation of moisture thereon, and further thermostatic means associated with the meat pieces adjacent the bone, and a connection between said last mentioned thermostatic means and said temperature control means effective to initiate a lowering of the air temperature upon the attainment of a predetermined maximum temperature of that portion of the meat pieces lying adjacent the bone.

GEORGE S. SPERTI.

References Cited in the file of this patent

UNITED STATES PATENTS

| Number | Name | Date |
|---|---|---|
| 1,237,458 | Bennett | Aug. 21, 1917 |
| 1,564,566 | Harris | Dec. 8, 1925 |
| 2,103,513 | Campbell | Dec. 28, 1937 |
| 2,169,081 | James | Aug. 8, 1939 |
| 2,192,348 | James | Mar. 5, 1940 |
| 2,384,203 | Sperti | Sept. 4, 1945 |

OTHER REFERENCES

"Tenderization of Meat," publication by Industrial Fellowship on Meat Merchandising, Mellon Institute, Pittsburgh, Pa., 1940.